Apr. 3, 1923.

F. GALIZIA

SANITARY SEAT

Filed Feb. 28, 1922

1,450,283

Frank Galizia  INVENTOR

BY *Victor J. Evans*
ATTORNEY

WITNESS

Patented Apr. 3, 1923.

1,450,283

UNITED STATES PATENT OFFICE.

FRANK GALIZIA, OF FARRELL, PENNSYLVANIA.

SANITARY SEAT.

Application filed February 28, 1922. Serial No. 539,988.

*To all whom it may concern:*

Be it known that I, FRANK GALIZIA, a citizen of the United States, residing at Farrell, in the county of Mercer and State of Pennsylvania, have invented new and useful Improvements in Sanitary Seats, of which the following is a specification.

This invention relates to the seats of barbers' chairs, dentists' chairs and the like and has for its object the provision of a removable and reversible seat which is fitted within a socket in the main seat and which may be either removed and replaced in case it is desired or which may be merely inverted so that either side may be disposed uppermost ready for use by an occupant.

An important object is the provision of a removable and reversible seat of this character which has the advantage of permitting it to be turned over so that in case it has become moist or damp from perspiration from an occupant such moist or damp side may be turned downwardly and be permitted to dry out while the other side is turned uppermost and used.

A further object is the provision of a seat of this character which is constructed that in case it becomes worn out or unsightly it may be replaced by a new one at much less cost than the cost involved in re-upholstering the chair or seat with which it is associated.

An additional object is the provision of a device of this character which will be simple and inexpensive in manufacture and installation, highly efficient in use, sanitary, durable in service and a general improvement in the art.

Figure 1:
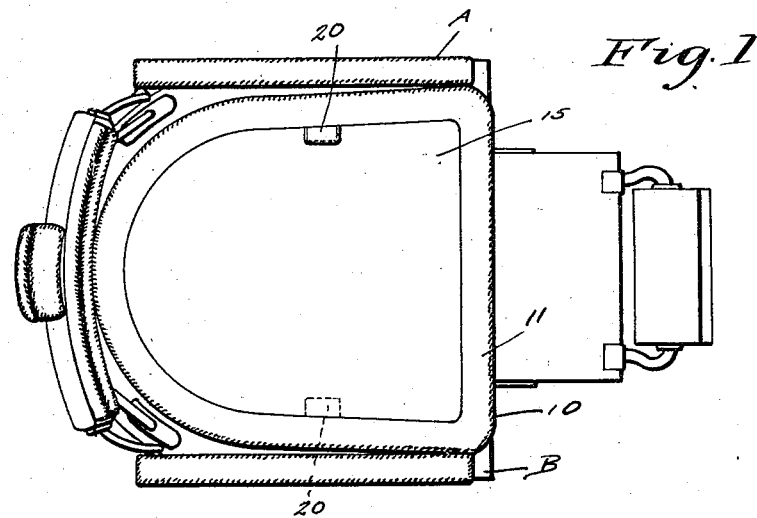
Figure 2:
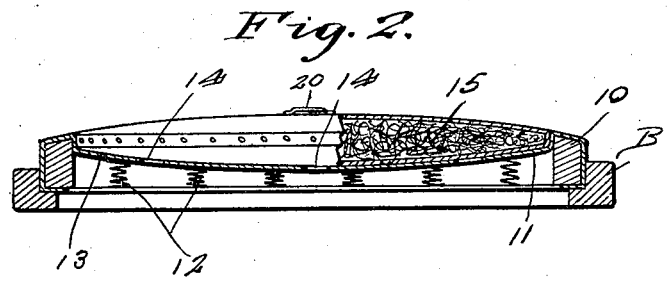
Figure 3:
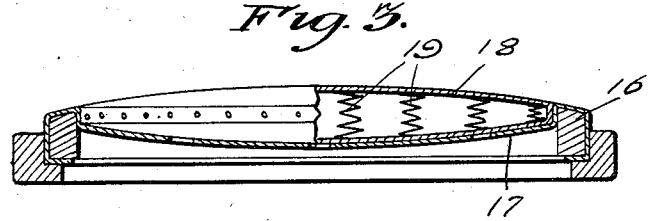

With the above and other objects and advantages in view, the invention consists in the details of construction to be hereinafter more fully described and claimed, and illustrated in the accompanying drawings in which, Figure 1 is a plan view of a barbers' chair seat equipped with my device and Figure 2 is a cross-sectional view and Figure 3 is a cross-sectional view through a modification.

Referring more particularly to the drawings the letter A designates a portion of a barbers' chair or the like which includes the usual frame B upon which is ordinarily disposed a leathered covered upholstered spring seat.

In carrying out my invention I provide a seat 10 which is mounted upon the frame B in the usual manner and which is covered with leather as indicated at 11 and which is also provided with a plurality of spiral springs 12 of the type commonly employed in upholstering. The central portion of the top of the seat 10 is formed with a recess 13 of any desired size and shape and the seat frame B is provided with a plurality of holes 14 which lead into the recess 13 indirectly so as to permit free passage of air to the recess. These parts constitute the main or stationary portion of the seat structure.

In the further carrying out of my invention I provide an auxiliary seat 15 which is reversible and which is removably disposed within the recess 13 and which is of such size and shape as to fill the latter and present a neat appearance. The seat 15 may be of any desired construction though it is here shown as formed of a padded cushion having the usual flexible covering which may be leather, cloth or any other suitable or preferred material. In actual practice for use in connection with barbers' chairs it is probable that the seat 15 would be covered with leather in the same manner as the seat 10.

In the use of the device it will be seen that the auxiliary seat 15 is disposed within the recess 13 with either side up whereupon the seat of the chair is used in exactly the same manner as ordinarily. When however the auxiliary seat 15 becomes damp from perspiration and the like it may be turned over so that the moist side may dry out while the fresh or dry side is disposed uppermost. In this way it will be seen that the reversal of the auxiliary seat from time to time will prevent its wearing out so quickly and will naturally greatly increase its life. The auxiliary seat has the distinct advantage of being reversible when a new customer uses the chair and this will naturally appeal to customers as assuring them of a dry fresh seat.

In the modified form of the device I have shown the main seat 16 as unprovided with the springs shown in Figures 1 and 2, the recess 17 having a rigid bottom and the removable seat 18 itself having the spring 19 therein. The use of this form of the device is of course exactly the same as that of the first described form, the only difference being that of the location of the upholstering spring.

From the foregoing description and a study of the drawings it will be apparent that I have thus provided a simply constructed and consequently inexpensive structure which will be highly advantageous in being attractive to customers of barber shops, and other places where such seats would be used, the seat being sanitary in view of the fact that it may be reversed and dried out when one side has become moist from perspiration. Owing to the simplicity of the construction it is apparent that there is nothing to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim;

1. A seat construction comprising a frame, a stationary seat mounted within said frame and including a frame portion covered with flexible material having its central portion downwardly concaved, and a seat cushion removably and reversibly mounted within said stationary seat and convex on both sides whereby one side will conformingly engage within the concave flexible material portion and the other side will extend upwardly beyond the frame portion of the stationary seat member.

2. A seat construction comprising a frame, a stationary seat mounted within said frame and including a frame portion covered with flexible material downwardly concaved, and a seat cushion removably and reversibly mounted within said stationary seat and convex on both sides whereby one side will conformingly engage within the concave portion and the other side will extend upwardly beyond the frame portion of the stationary seat member, said flexible material being formed with holes for ventilating purposes to permit drying of the previously exposed surface of the removable cushion after the same has been removed and replaced within the stationary portion in reversed position.

3. A seat construction comprising a frame, a stationary seat mounted within said frame and including a frame portion covered with flexible material downwardly concaved, and a seat cushion removably and reversibly mounted within said stationary seat and convex on both sides whereby one side will conformingly engage within the concave portion and the other side will extend upwardly beyond the frame portion of the stationary seat, said removable seat cushion being provided at opposite sides with finger holds whereby its removal may be facilitated.

In testimony whereof I affix my signature.

FRANK GALIZIA.